Figure 1:
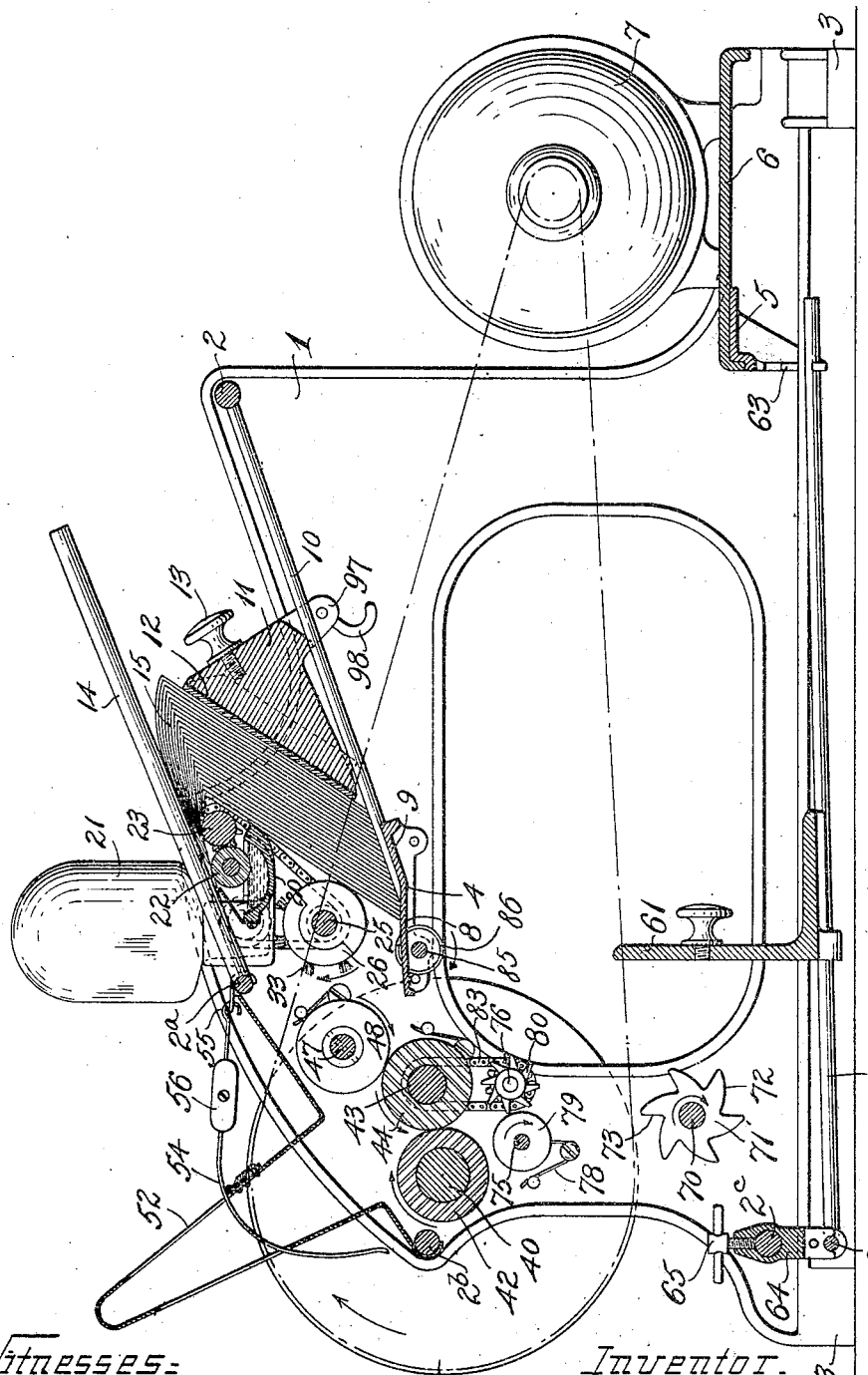

W. R. ALLEN.
FEEDING MECHANISM.
APPLICATION FILED MAR. 30, 1911.

1,086,119.

Patented Feb. 3, 1914.

4 SHEETS—SHEET 1.

Witnesses:
Brennan B. West
Hugh B. McGill

Inventor.
William R. Allen
By Albert H. Baker Atty.

W. R. ALLEN.
FEEDING MECHANISM.
APPLICATION FILED MAR. 30, 1911.

1,086,119.

Patented Feb. 3, 1914.
4 SHEETS—SHEET 3.

Witnesses:
Brennan B. West
Hugh B. McGill

Inventor.
William R. Allen,
By Albert H. Baker
Atty.

W. R. ALLEN.
FEEDING MECHANISM.
APPLICATION FILED MAR. 30, 1911.
1,086,119.
Patented Feb. 3, 1914.
4 SHEETS—SHEET 4.
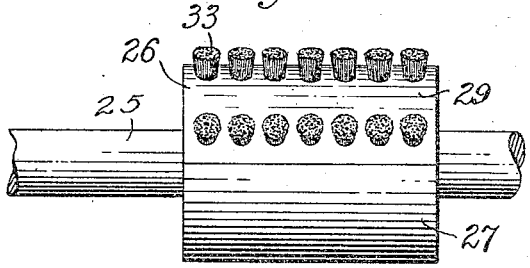
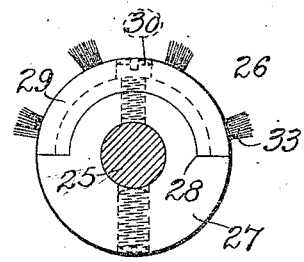
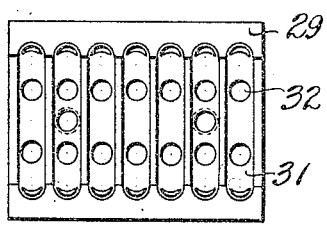
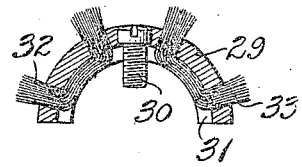
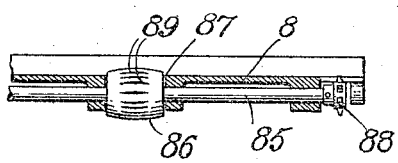
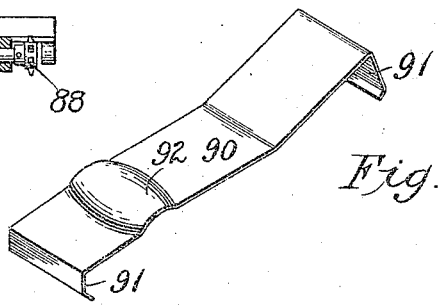
Witnesses:
Brennan B. West.
Hugh B. McGill.
Inventor.
William R. Allen
By Albert H. Bates,
Atty.

UNITED STATES PATENT OFFICE.

WILLIAM R. ALLEN, OF CLEVELAND, OHIO, ASSIGNOR TO THE AMERICAN MULTIGRAPH COMPANY, OF CLEVELAND, OHIO, A CORPORATION OF OHIO.

FEEDING MECHANISM.

1,086,119.  Specification of Letters Patent.  Patented Feb. 3, 1914.

Application filed March 30, 1911. Serial No. 617,851.

*To all whom it may concern:*

Be it known that I, WILLIAM R. ALLEN, a citizen of the United States, residing at Cleveland, in the county of Cuyahoga and State of Ohio, have invented a certain new and useful Improvement in Feeding Mechanism, of which the following is a full, clear, and exact description, reference being had to the accompanying drawings.

This invention relates to a feeding device which is adapted for various uses. It may be well employed, for example, in feeding envelops.

In the particular embodiment shown, the invention is applied to envelop sealing machines of the type disclosed in the patents to John A. Markoe, No. 820,427, issued May 15, 1906, and No. 891,277, issued June 23, 1908.

The principal objects of the present invention are to make the feed more certain and efficient, insuring an effective feeding of envelops or other articles of various sizes, weights and conditions, and reducing to a minimum any liability of the feed roller to miss an article or to feed it improperly or at the wrong time.

In carrying out the invention I employ a feed deck and a feed roller having a base portion and a portion equipped with elastic filamentous fingers, the fingers being adapted to engage and feed an envelop and the base portion allowing the sealing flap to pass freely. Such feature is claimed herein. It should be noted, however, that a feed roller having elastic filamentous fingers, but without reference to the grouping of the fingers on the roller, is claimed broadly in my application No. 628,883, filed May 22, 1911.

As illustrated herein, and as hereinafter more fully described, my complete envelop sealer, in addition to the special feed roller and coöperating parts of this invention, includes means for retarding the fed envelops to prevent the feeding of more than one envelop at a time. The retarder or separator, however, is not claimed herein but in my application #654,708, filed October 14, 1911. Reference should, accordingly, be made to the patent issued on that application for claims on such feature. It is convenient, however, to show herein the complete machine embodying the retarder, sealer and stacker, as well as the features claimed herein.

Figure 2:
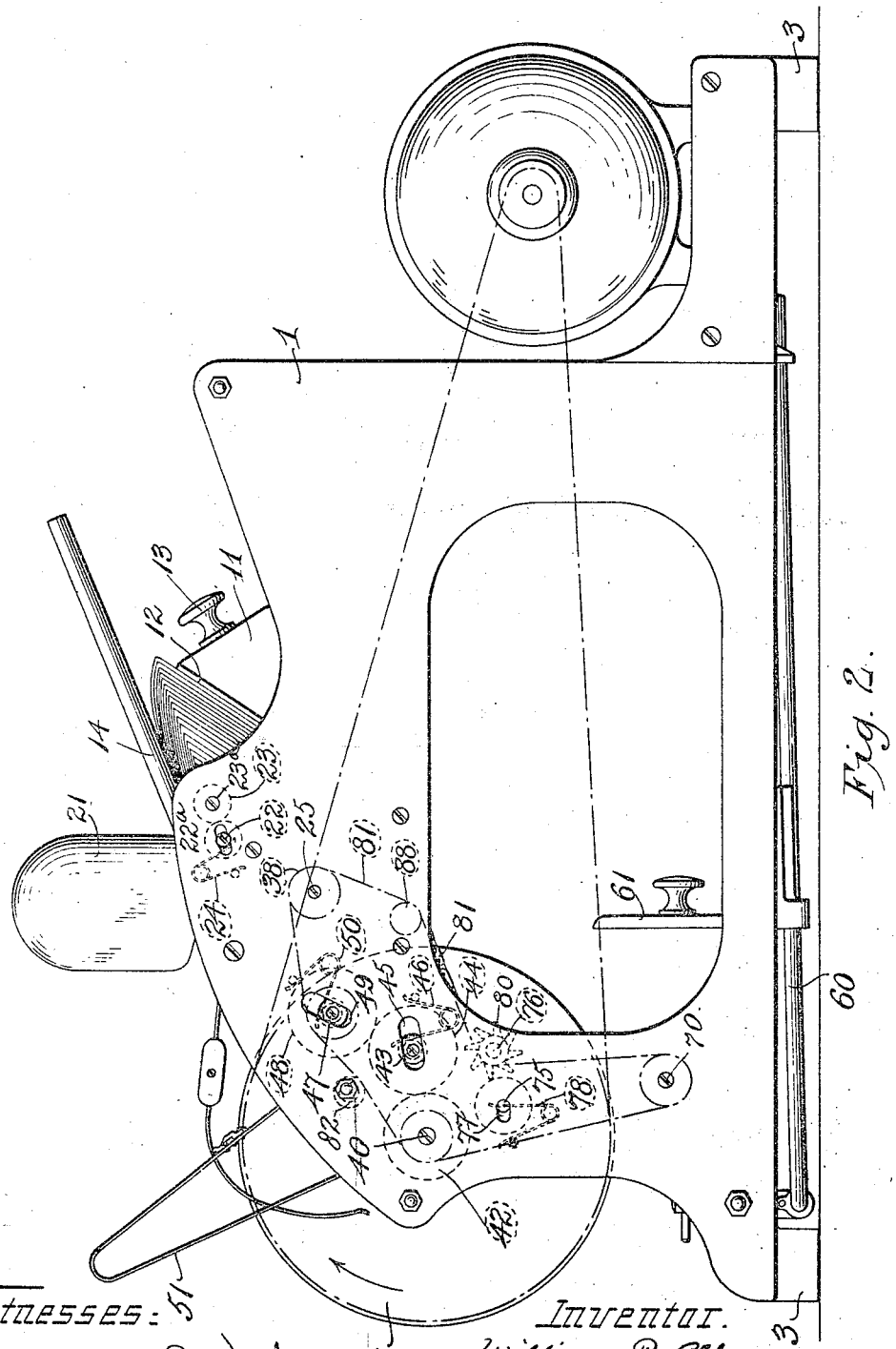
Figure 3:
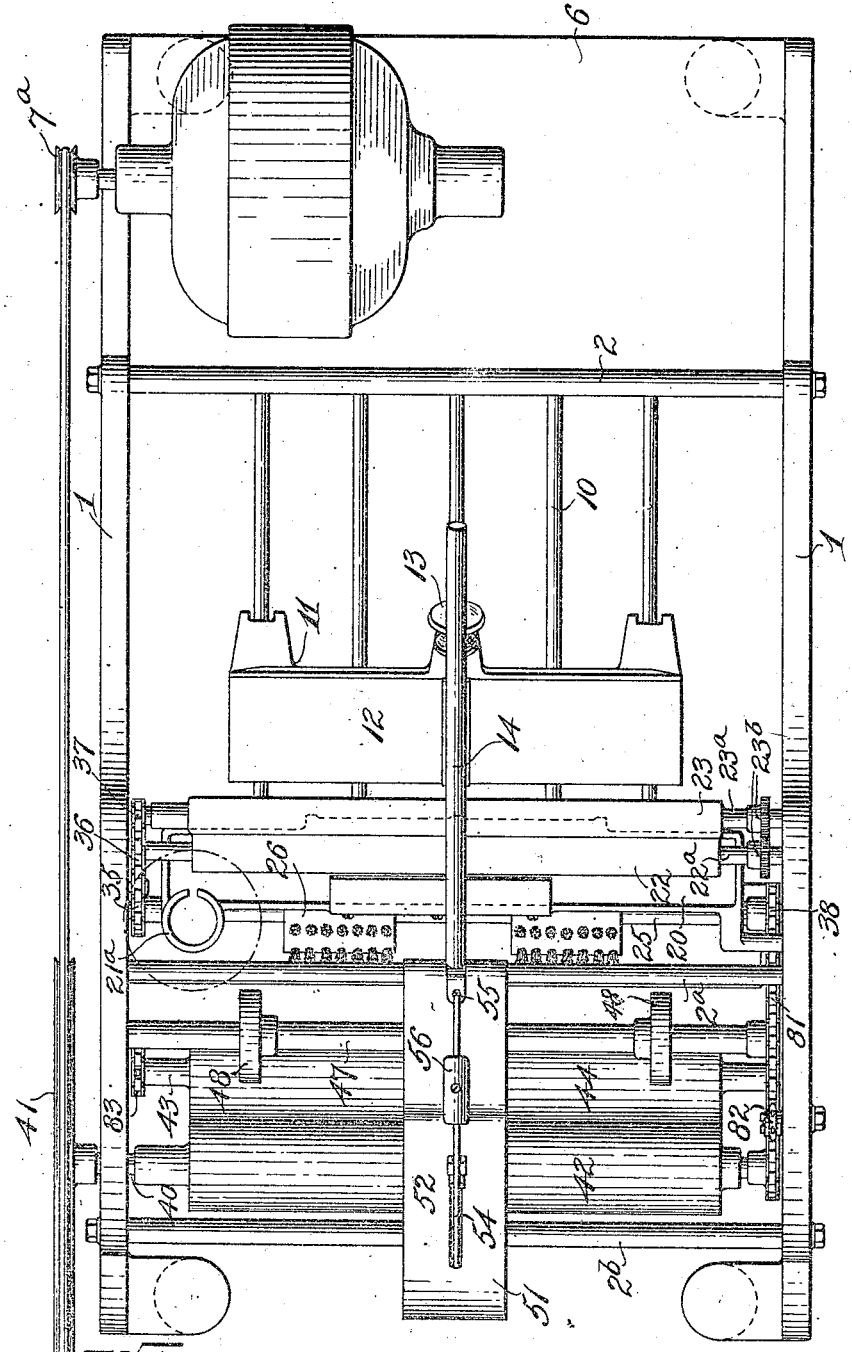

One embodiment of my invention is illustrated in the drawing accompanying and forming a part of this description, in which:

Figure 1 is a vertical central cross sectional view of the complete machine; Fig. 2 a side elevation of the same; Fig. 3 a plan of the same; Fig. 4 a detail side view of the feed roller; Fig. 5 an end view of such roller; Fig. 6, an inside view of the finger-carrying segmental plate forming a part of such roller; Fig. 7 a transverse cross sectional view of this plate; Fig. 8 a detail view of the retarding roller; and Fig. 9 a view of a modified form of retarding devices adapted to be used instead of a retarding roller.

Describing the parts by reference characters, 1 indicates the side plates of the machine, these side plates being connected by transverse braces 2, 2$^a$, 2$^b$, and 2$^c$, and having supporting feet 3. The side pieces are also connected by the plates 4 and 5, the latter of which is illustrated as formed to support a plate 6 upon which a motor 7 is carried. The plate 4 is formed with a substantially horizontal portion 8 and upwardly extending portion 9, which latter portion is shown as grooved to receive the forward ends of inclined bars 10 forming a feeding deck, the rear ends of these bars being secured to the brace 2.

Slidably mounted upon the bars 10 is a weighted follower 11 having an inclined forward surface 12 and also having a knob or handle 13. A suitable distance above the feeding deck is a moistening roller 23, hereinafter more fully described. The envelops to be sealed are arranged with flaps overlapping, as illustrated at 15, and stacked upon the bars 10 in front of the follower 11 with the undermost flap resting on the moistening roller 23, a suitably pivoted rod 14 pressing by gravity down upon the outer surfaces of the flaps. The slope of the bars 10 is such as to cause the follower 11 to urge the envelops forward with a steady, gentle gravity pressure.

Above the plate 4 is supported a transverse trough 20 adapted to contain a moistening liquid, and communicating with this trough is a reservoir 21 forming a fluid supply, this reservoir being illustrated as an inverted bottle supported in a seat 21ª and adapted to maintain a constant level of liquid within the trough. Dipping into this trough is a transverse roller 22 and engaging with this roller is the parallel transfer or moistening roller 23 above mentioned. These rollers are carried upon shafts 22ª and 23ª, the latter of which is journaled in a definite position in the plates 1, and the former of which is journaled in an elongated slot, as shown in Fig. 2, and yieldingly held in contact with the companion roller by means of springs 24. The shafts 22ª and 23ª are provided at one end with intermeshing gears 23ᵇ (Fig. 3). Below and slightly forward of the trough 20 is supported a revoluble shaft 25 which carries one or more feed rollers 26, the construction of which will now be described. These rollers 26 are illustrated particularly in Figs. 4–7. Each consists of a generally cylindrical body 27 having a segmental exterior portion thereof cut away, as shown at 28. A segmental shell 29 (shown as semi-cylindrical) is provided of the shape and thickness to complete the cylindrical form of the body 27, and is attached thereto by radial screws 30. Arcuate grooves 31 are formed in the interior of this shell, and radial perforations 32 are formed through the shell intersecting these grooves. Elastic frictional strips are laid in the grooves 31 with their ends projecting through the perforations 32, as shown in Fig. 7, to produce projecting resilient fingers 33. The depth of the grooves 31 is such that when the shell 29 is secured to the body 27 the bodies of the strips will be firmly compressed and securely held in place.

A very effective method of construction, and at the same time, a cheap one, is to use small ordinary rubber bands for the elastic strips, drawing their looped ends through the two related holes and then cutting the loops off squarely, as illustrated in Fig. 7. While this construction provides a very efficient roller, I do not desire to be limited thereto, as these projections might be made of various other materials and in different ways. I have found, however, that extremely satisfactory results are obtained with fingers of this nature, because of the great softness and flexibility obtained by the use of the separate soft rubber strands.

Upon one end of the shaft 25 is mounted a sprocket wheel 35 (Fig. 3) which engages a chain 36 passing over a companion sprocket 37 carried by the shaft 23ª for the purpose of driving the roller 23. The other end of the shaft 25 is provided with a sprocket wheel 38, by means of which the same is driven, in a manner to be later described.

In front of the plate 4 and spaced at a distance therefrom is a horizontal shaft 40, which is the primary drive shaft in the embodiment shown, having at one end the drive wheel 41 belted to the pulley 7ª of the motor. Between the frame plates this shaft carries one of the sealing rollers 42. Between the shaft 40 and the edge of the plate 4 is a parallel shaft 43 having thereon a companion sealing roller 44 contacting with the roller 42. The shaft 43 is journaled in an elongated slot 45 so as to be movable toward and from the shaft 40, to permit the passage between the sealing rollers of envelops of varying thickness, and is yieldingly pressed toward the shaft 40 by means of a spring 46. Above the shaft 43 and slightly nearer the plate 4 is a third shaft 47 having thereon a plurality of spaced feeding wheels 48, shown in Fig. 3 as suitably roughened upon their peripheries, either by knurling or by the application of a band of suitable material thereto. This shaft 47 is journaled in an elongated slot 49 so as to be free to move toward and from the shaft 43, and is impelled toward that shaft by means of a spring 50.

Mounted above the sealing rollers, on the brace rods 2ª and 2ᵇ, is the reversely bent stationary plate 51 forming an elongated inclined recess adapted to receive the envelops in advance of their passage through the sealing rollers. Registering elongated slots 52 are formed through the sides of the plate for the passage of the bent arm 54, which is suitably pivoted, as at 55, to an ear on the brace 2ª. This arm is provided with an adjustable weight 56 for a purpose to be hereinafter described, in connection with the description of the operation. In passing it may be said that the envelops fed forwardly by the roller 26 pass bottom edge foremost between the rollers 47 and 44 and into the pocket provided by the member 52 and then pass downwardly (top edge foremost) between the rollers 44 and 42 and are sealed by the pressure thereof.

In the bottom of the machine the stacking mechanism is carried, this stacking mechanism including two or more parallel adjustable bars 60 on which rests a slidable plate 61. In the embodiment illustrated, the rods 60 may be described as forming the sides of a letter U, the base of which is indicated at 62. The free ends of these rods are supported in hooks or perforations 63 at the rear of the machine, and the cross portion 62 is embraced by a clamp 64 rotatably mounted upon the brace 2ᶜ and adapted to be secured thereto by the set screw 65. The free ends of these rods will be supported in the upper or the lower perforations or hooks 63, depending upon the size of the envelops being handled, and the inclination of these rods will be regulated by the angular adjustment of the clamp 64.

Journaled transversely of the machine, beneath the sealing rollers is a shaft 70 having thereon a plurality of star wheels 71. The advancing faces of the teeth of these wheels are rounded, as shown at 72, to make wipers, and their rearward faces are preferably abrupt or radial, as shown at 73. Between this shaft and the sealing rollers are a pair of parallel shafts 75 and 76, the former of these being journaled in an elongated slot 77 so as to be shiftable toward and from the latter and being yieldingly pressed toward the latter by means of springs 78. This shaft 75 is provided with rollers 79, and the shaft 76 is provided with two or more star wheels 80, preferably having abrupt or radially faced teeth.

Each of the shafts 40, 47, 25, 76, and 70 has on its end adjacent to the inner side of the plate 1 a sprocket, and a single chain 81 is shown in Fig. 2 as looped around them all. Between the shafts 40 and 47 I preferably journal an idler sprocket 82, mounting the same upon an eccentric, so that the tension of the chain can be adjusted. The opposite end of the shaft 76 is also provided with a sprocket carrying a chain 83 (Fig. 1) by means of which the shaft 43 is driven.

The operation of the parts so far described is as follows: The envelops being stacked together with their flaps overlapping and inserted in the machine, as already described, the weight of the follower 11 forces them forwardly into proximity to the feed roller 26 with the flap of the foremost envelop engaging the transfer roller 23. The rotation of the drive wheel 41 drives the various rollers in the direction indicated by the arrows in Fig. 1, through the agency of the chains and sprockets above described. The rotation of the rollers 22 and 23 moistens the flaps of the envelops and the rotation of the roller 26 causes the fingers 33 to engage the nearest envelop and draw it forwardly over the apron 8 and deliver it to the rollers 44 and 48. These rollers pass the envelop upside down into the recess defined by the plate 52 against the weight of the arm 54 until the envelop has entirely cleared the roller 48. The continuation of the rolling motion of the roller 44 advances the top of the envelop to the space between it and the roller 42, whereupon the weight of the envelop aided by the arm 54 and weight 56 causes it to be seized by the sealing rollers 42 and 44, which now press the flap securely against the back of the envelop. As the envelop emerges from between the sealing rollers it passes between the rollers 79 and star wheels 80 and drops between two adjacent teeth of the star wheel 71. As the latter wheel rotates the forward face of one of its teeth presses back the envelops already delivered, making a space for the incoming envelop and the forward face of the following tooth presses the newly arrived envelop into place. As the bottom edge of the envelop clears the rollers 79 it is engaged by one of the teeth of the star wheel 80 and shoved to one side to make room for the following envelop. It will be seen that the roller 26 has fingers on only one side and makes one complete revolution for each envelop sealed. This causes one envelop to be so far advanced through the machine before the starting of the next envelop that there is no interference between them. Moreover, the rubber fingers are out of the way when the exposed moistened flap of the envelop passes the roller 26.

A disadvantage found in previous machines of this type has been the liability of the feed roller to advance more than one envelop at a time because of the friction of the envelops upon each other. This objection is overcome in my machine by providing a suitable retarding device operating to hold back the envelops behind the foremost one. One form of this retarder is shown in Figs. 1 and 8. In such form I journal on the underside of the apron 8 a transverse shaft 85 carrying a plurality of rounded retarding rollers 86, which lie in slots 87 formed in the plate and project a short distance above the top thereof. In Fig. 3 I have shown two transfer rollers 48 spaced upon opposite sides of the center of the machine, and I prefer to employ the same number of retarding rollers. The end of the shaft 85 is provided with a sprocket 88 which meshes with the chain 81, and is driven thereby in the same direction as the feed roller 26. This direction (at the top of the roller 86) is opposite to the direction of the movement of the envelops, so that their passage over the plate is materially impeded. This hindrance is not sufficiently great to overcome the grip of the fingers 33 upon the first envelop, but is sufficiently greater than the friction between successive envelops to prevent the second envelop from passing thereover until positively grasped by the feed roller 26.

I find that a roughening of the roller 86 by narrow and shallow longitudinal depressions 89 in its surface properly aids the retardation. I find also that it is preferable to make the roller longitudinally convex, or of the barrel-shape shown, with the highest point of its ends adjacent to the top of the plate 8. This prevents marring the envelops or giving them too strong a push backwardly.

I have discovered that in many instances the benefit of the retarding roller can be obtained by less complicated means, such as is shown in Fig. 9. In this figure I have illustrated a clip 90 of thin metal formed to cling closely to the surface of the plate 4 and having resilient inturned lips 91 at its ends adapted to spring over the edges of the plate. At a point substantially the same as the position of the retarding roller 86 I provide an upwardly bent rounded projection, or boss 92 which the lower edges of the envelops are forced to ride over. This boss is similar in shape to the projecting part of the roller 86 and is found to possess many of the advantages of the roller. Either the boss or the roller constitutes a doubly convex "hump" in the path of the bottom edge of the envelop. This hump, so located, I find much more efficient than an elastic retarder engaging the envelops back of the foremost one, which has heretofore been proposed.

I preferably form the follower 17 with a bifurcated depending ear 97 (Fig. 1) and within this ear I pivot a hook 98. If it be desired to withdraw the follower entirely from the feed deck, it is merely necessary to grasp the knob 13 and draw it rearwardly, whereupon the hook 98 will engage the brace 2 and the follower will swing over the brace and remain suspended therefrom.

While I have necessarily described my invention in detail, I do not propose to be limited to such details except as the same may be positively included in the claims hereto annexed or may be rendered necessary by the state of the prior art.

Having thus described my invention, what I claim is:—

1. The combination of a feed roller having a plurality of elastic fingers each composed of soft strands located on one side of the roller, means for supporting articles to be fed so that the fingers may engage them, and means for retarding the advance edge of the articles as they are fed.

2. A feed roller having a plurality of projecting fingers, said fingers being confined to a portion of said roller, and each of said fingers consisting of a plurality of strands of soft rubber.

3. A feed roller having a body and a removable segmental cap with holes through it, and soft strands clamped between the outer face of the body and the inner face of the cap and projecting through said holes to make external fingers.

4. A feed roller having a recessed body portion and a removable segmental shell seating in the recess and held to the body, said shell having perforations, pieces of rubber having their ends projecting outwardly through said perforations and forming flexible fingers, the bodies of said pieces being gripped between said body portion of the roller and said shell.

5. A feed roller having a body of substantially cylindrical shape, a portion of said body being formed as a hollow removable shell, the inner surface of said shell being formed with arcual grooves, and said shell having perforations intersecting said grooves, strips in said grooves and having their ends projecting through said perforations and forming flexible fingers, the bodies of said strips being gripped between said body and the bottom of said grooves.

6. In a feeding machine, the combination, with a feed deck adapted to receive the articles to be fed and means for advancing the articles therealong, of a feed roller adjacent to said deck and having a plurality of projecting friction fingers composed of soft strands adapted to grasp and advance the nearest article, said friction fingers being restricted to one-half of said feed roller and said roller being arranged to make one complete revolution for each article advanced thereby, and means for retarding the passage of said articles from said feed roller so as to prevent the delivery of more than one envelop at a time.

7. The combination of a feed deck adapted to support the lower edge of articles to be fed, and a feed roller adapted to engage the body portion of such articles above the deck, said feed roller having elastic fingers on one side and being bare on the other side, each finger consisting of a group of soft strands.

8. The combination, with a feed deck, of a feed roller adapted to act on articles standing on the deck, said feed roller having a group of elastic fingers, each finger consisting of a plurality of soft strands projecting from the periphery of the roller.

9. The combination of a feed deck, a feed roller adapted to act on envelops stacked on the feed deck, said feed roller having elastic filamentous fingers grouped onto one portion of the surface and omitted on the opposite portion, whereby the fingers may engage the envelop sufficiently to feed the same and will be out of contact with the envelop when the flap passes the feed roller.

In testimony whereof, I hereunto affix my signature in the presence of two witnesses.

WILLIAM R. ALLEN.

Witnesses:
W. DUNLAP,
ALBERT H. BATES.